United States Patent

Prüss et al.

[11] Patent Number: 5,248,126
[45] Date of Patent: Sep. 28, 1993

[54] SLIDE FOR A SLIDE VALVE, AND METHOD FOR THE MANUFACTURE THEREOF

[75] Inventors: Ludwig Prüss; Gerhard Preine, both of Braunschweig, Fed. Rep. of Germany

[73] Assignee: Volkswagen A.G., Wolfsburg, Fed. Rep. of Germany

[21] Appl. No.: 943,742

[22] Filed: Sep. 11, 1992

[30] Foreign Application Priority Data

Sep. 12, 1991 [DE] Fed. Rep. of Germany ....... 4130260

[51] Int. Cl.$^5$ .................... F16K 31/00; F15B 13/04
[52] U.S. Cl. ......................... 251/368; 137/625.68
[58] Field of Search ................. 251/368; 137/625.68, 137/625.69

[56] References Cited

U.S. PATENT DOCUMENTS

| | | | |
|---|---|---|---|
| 2,964,023 | 12/1960 | Meulendyk | 137/625.68 |
| 3,534,774 | 10/1970 | Tennis | 137/625.69 |
| 4,009,730 | 3/1977 | Starling | 137/625.68 |
| 4,069,843 | 1/1978 | Chatterjea | 137/625.69 |
| 4,695,602 | 9/1987 | Crosby et al. | 524/439 |
| 4,932,438 | 6/1990 | Kitamura et al. | 251/368 |

Primary Examiner—A. Michael Chambers
Attorney, Agent, or Firm—Brumbaugh, Graves, Donohue & Raymond

[57] ABSTRACT

A slide for a slide valve consists of an injection-molded, glass fiber reinforced, mineral-filled thermoplastic material having a high thermal stability of shape, a compressive strength of not less than 110 MPa and a Rockwell hardness of not less than R-117. The only machined surfaces are ground peripheral surfaces forming the sealing surfaces of the several subdivisions of the slide, which have an intact homogeneous texture.

9 Claims, 2 Drawing Sheets

SLIDE FOR A SLIDE VALVE, AND METHOD FOR THE MANUFACTURE THEREOF

BACKGROUND OF THE INVENTION

This invention relates to slides for slide valves such as those used in hydraulic control systems and to methods for manufacturing such slides.

In hydraulic transmissions, for example, hydraulic control systems having slide valves are used and, in some cases, several slides must be arranged in one valve housing to achieve a high functional compactness.

In conventional slide valve arrangements, the slides are generally made of aluminum, and they require at least one turning and two grinding operations. Between the two grinding operations, surface hardening or anodization processes must be performed. In order to achieve adequate stability of the valve control edges when subjected to high flow velocity of the hydraulic fluid with the consequent danger of cavitation, the anodization must provide a suitable wear-resistant and hard surface coating, which requires control of current intensity, time and bath temperature among other factors. Manufacture of such slides thus involves a great deal of expense.

SUMMARY OF THE INVENTION

Accordingly, it is an object of the present invention to provide a slide for a slide valve and a method of manufacture thereof which overcomes the above-mentioned disadvantages of the prior art.

Another object of the invention is to provide a slide for a slide valve which can be made more simply and efficiently than those of the prior art.

These and other objects of the invention are attained by providing a slide which consists of an injection-molded, glass fiber reinforced, mineral-filled thermoplastic material having a high thermal stability of shape, a compressive strength of not less than 110 MPa and a Rockwell hardness of not less than R-117, and in which the sealing peripheral surfaces between the valve slide subdivisions of the slide are the only ground surfaces and those surfaces have an intact homogeneous texture.

Preferably, the plastic material is a polyphenylene sulfide (PPS) injection molding compound.

A particularly advantageous plastic material that may be used is an injection molding compound supplied by Philips under the trade name Ryton R-7, which has the following properties:

| | |
|---|---|
| Tensile strength | 95 to 96 MPa |
| Ultimate elongation | 0.7% |
| Bending modulus of elasticity | 17,000 to 17,500 MPa |
| Bending strength | 158 to 175 MPa |
| Compressive strength | 158 MPa |
| Rockwell hardness | R-121 |
| Hot shape stability (at 1.81 MPa, tempered 4 hours at 260° C.) | 260° C. |
| Water absorption (24 hours at 25° C.) | 0.03% |
| Density | 1.9 g/cm$^3$ |

Because the specified plastic material has approximately the same coefficient of expansion as aluminum, the valve housing may be made of aluminum as in conventional valves. The specified plastic material exhibits an adequate wear performance, resisting erosion at the control edges and ensuring stability of shape in service, is recyclable, and its lighter weight compared to aluminum provides a more dynamic control performance.

With the valve slide of the invention, the machining of an injection molded slide blank is limited to a single grinding operation. In order not to substantially impair the texture of the slide surface by the grinding and therefore maintain a wear-resistant surface texture, the surfaces to be ground are molded with a grinding allowance of only a few hundredths of a millimeter. This ensures that, during the grinding operation, no stresses are generated or altered in the plastic part that might cause a deformation of the slide. Because very little stock is thus removed by grinding, a high abrasion and/or wear resistance is achieved.

Such precision fabrication of the slide blank requires uniform and complete filling of the injection mold, with the molding parameters regulated so as to maintain, in particular, a constant pressure and a constant temperature during molding.

Because the amount of stock removed is small, only a short grinding time is required. Consequently, any axial deformation producing sticking of the slide valve, which could be caused by wide temperature fluctuations, is avoided.

To achieve a uniform filling of the injection mold, and avoid formation of bubbles or the like in the slide, the slide is shaped so as to have approximately uniform cross sectional area of material along its length. Thus, for example, the shank of the slide may be cross-shaped in cross section.

Manufacture of the slide by injection molding allows for the possibility of transferring additional valve and/or control functions out of the valve housing and into the valve slide. Thus, for example, it is possible to mold bypass passages, longitudinal and transverse holes, specially shaped control edges or the like onto and/or into the slide, without requiring any subsequent machining to provide them. Such control passages, edges or holes can therefore be eliminated from the valve housing, which may consequently be made correspondingly smaller and/or may have space provided for other functions.

Dimensional stability is preferably assured by a systematic saturation of the slide blank with moisture. In service, this will prevent change of dimensions by swelling due to diffusion of oil. Tightness of the valve seal and controllability of a valve provided with a slide made according to the invention are thus assured.

BRIEF DESCRIPTION OF THE DRAWINGS

Further objections and advantages of the invention will be apparent from a reading of the following description in conjunction with the accompanying drawings, in which.

DESCRIPTION OF PREFERRED EMBODIMENTS

Figure 1A:
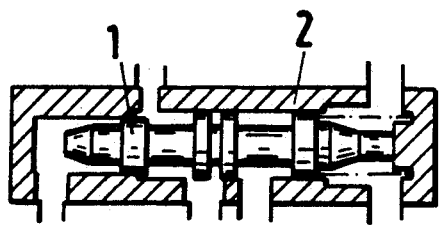
FIGS. 1A and 1B are views in longitudinal section showing a slide valve in the actuated and in the unactuated position; respectively.
Figure 1B:
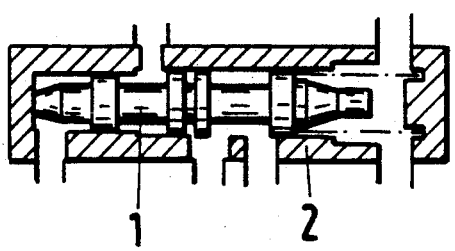

In the representative embodiment shown in FIG. 1A, a slide valve has a slide 1, made of a plastic material, displaceably mounted in a valve housing 2. The slide 1 is shown in its actuated position. FIG. 1B is a view similar to FIG. 1A, but showing the slide 1 in its unactivated position.

Figure 2:
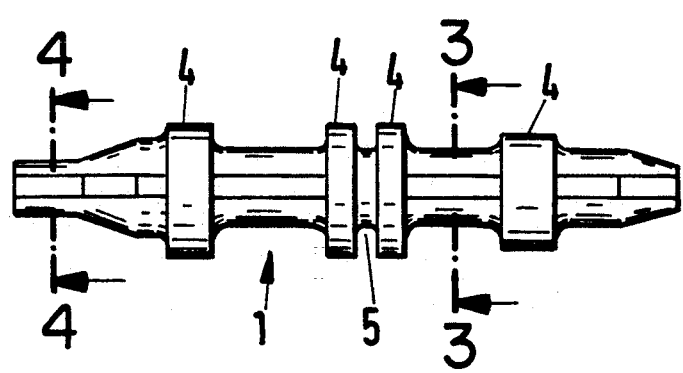
FIG. 2 is an enlarged side view showing the slide of FIG. 1.
Figure 3:
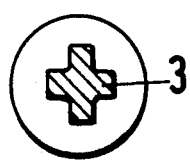
FIGS. 3A and 3B are cross sectional views of the slide shown in FIG. 2, taken on the lines A—A and B—B thereof respectively.

As seen in the enlarged view of FIG. 2 and the cross-sectional views of FIGS. 3A and 3B, the slide i has approximately uniform cross sectional area through its length. To this end, the several segments of the shank 3 of the slide are cross-shaped in cross section, as illustrated by FIGS. 3A and 3B. The peripheral surfaces 4 of the slide, which provide the sealing surfaces between the several subdivisions of the slide, are the only surfaces of the slide 1 which need to be finished by grinding. FIG. 2 also shows that, to avoid lumping of material and so improve the flow of material in the molding operation and to avoid formation of bubbles, the peripheral surface 4 of the middle subdivision of the slide is interrupted by a waist 5.

FIGS. 4A-4G show examples of valve and/or control functions which ar integrated into certain subdivisions of the slide. These functions must be provided in the valve housing in conventional slide valves, but can be molded into a slide made according to the invention during fabrication, without requiring an additional finishing.

Figure 4:
FIG. 4A-4G are fragmentary views of typical slides according to the invention, showing seven different examples of valve and/or control functions provided in the body of the slide.
Figure 4A:
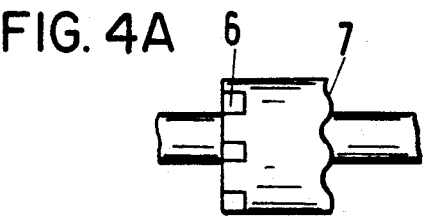
Figure 4B:
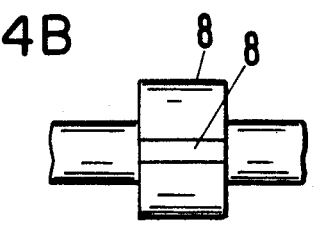
Figure 4C:
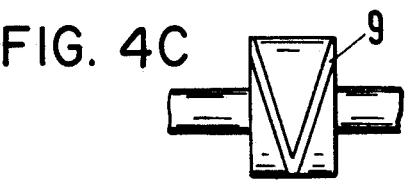
Figure 4D:
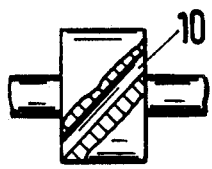

In FIG. 4A, the slide has specially configured leading and trailing control edges 6 and 7, respectively. FIG. 4B shows a slide with bypass passages 8 formed in a peripheral surface 4, which extend parallel to the slide centerline, to provide a definable build-up and/or decay of pressure or else to permit a definable volume flow. FIG. 4C shows a helical passage 9 forming an improved hydraulic orifice. FIG. 4D discloses a molded transverse hole 10 forming a defined bypass passage.

Figure 4E:
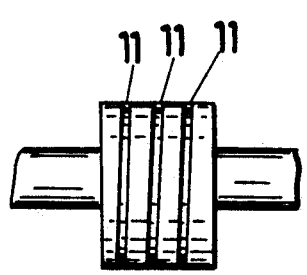
Figure 4F:
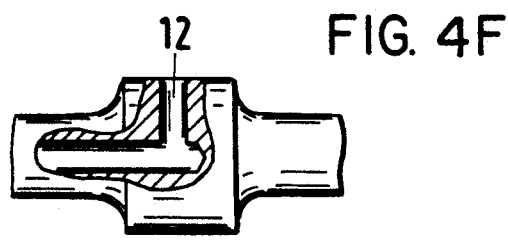
Figure 4G:
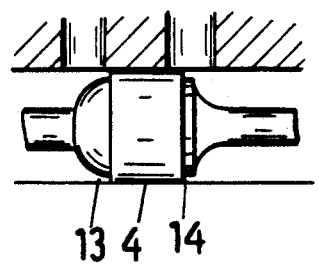

According to FIG. 4E, several circumferential grooves 11 are provided in a peripheral surface 4 in order to create uniform hydraulic orifices. The example shown in FIG. 4F has a molded longitudinal and transverse hydraulic passage 12, replacing a passage which is normally provided in the valve housing. FIG. 4G shows offset control edges 13 and 14, respectively, leading and following a peripheral surface 4. This arrangement provides hydrodynamically favorable flow impact surfaces for the reduction of transverse forces on the slide.

Although the invention has been described herein with reference to specific embodiments, many modifications and variations therein will readily occur to those skilled in the art. Accordingly, all such variations and modifications are included within the intended scope of the invention.

We claim:

1. A slide for a slide valve comprising an injection-molded, glass fiber-reinforced, mineral-filled thermoplastic material having a high thermal stability of shape, a compressive strength of not less than 110 MPa and a Rockwell hardness of not less than R-117, and wherein the only machined surfaces are ground peripheral surfaces forming the sealing surfaces between subdivisions of the slide and those surfaces have intact homogenous texture.

2. A slide according to claim 1 wherein the plastic material is a polyphenylene sulfide injection molding compound.

3. A slide according to claim 1, which has approximately uniform cross sectional area throughout its length.

4. A slide according to claim 1 having a body which is formed to provide operational functions.

5. A slide according to claim 4 wherein the slide body includes at least one bypass passage.

6. A slide according to claim 4 wherein the slide body includes at least one longitudinal passage.

7. A slide according to claim 4 wherein the slide body includes at least one transverse passage.

8. A slide according to claim 4 wherein the slide body has specially shaped control edges.

9. A slide according to claim 1 wherein the slide has a shank with a cross sectional shape.

* * * * *